United States Patent [19]
Simon

[11] Patent Number: 5,263,405
[45] Date of Patent: Nov. 23, 1993

[54] HOT AIR CORN POPPER FOR PACKAGING
[75] Inventor: Robert M. Simon, Livingston, N.J.
[73] Assignee: ESP Products, Inc., New York, N.Y.
[21] Appl. No.: 24,642
[22] Filed: Mar. 1, 1993
[51] Int. Cl.$^5$ .................................................. A23L 1/18
[52] U.S. Cl. ................................. 99/323.7; 99/323.5; 99/323.9
[58] Field of Search ................. 99/323.5, 323.6, 323.7, 99/323.8, 323.9, 323.11, 323.4, 357, 476, 451, 331, 332; 426/445, 450

[56] References Cited
U.S. PATENT DOCUMENTS

| | | | |
|---|---|---|---|
| 1,436,400 | 11/1922 | Mabey | 99/323.11 |
| 2,922,355 | 1/1960 | Green | 99/323.11 |
| 3,323,440 | 6/1967 | Grant . | |
| 4,152,974 | 5/1979 | Tienor . | |
| 4,307,657 | 12/1981 | Avery | 99/323.7 |
| 4,417,505 | 11/1983 | Pietrobelli . | |
| 4,438,682 | 3/1984 | King et al. | 99/323.7 |
| 4,512,247 | 4/1985 | Friedman | 99/323.9 |
| 4,702,158 | 10/1987 | Ishihara . | |
| 4,727,798 | 3/1988 | Nakamura . | |
| 4,881,457 | 11/1989 | Lyga et al. | 99/323.5 |
| 5,069,923 | 12/1991 | Hubbard et al. | 426/445 |
| 5,115,731 | 5/1992 | Maitland | 99/357 |

FOREIGN PATENT DOCUMENTS
1268146 11/1986 Japan .................................. 99/323.5

Primary Examiner—Timothy F. Simone

[57] ABSTRACT

A hot air corn popping machine supplies popped corn which is useful as a packaging material. Unpopped kernels are fed into a hopper and through a motorized feed unit and sensor switch which provide controlled amounts of kernels into a popping chamber within a heating chamber. A blower motor provides pressurized air through heating coils around the popping chamber to pop the corn and direct the popped corn through an exhaust system. A ramp having a grating at the lower end separates unpopped kernels which are collected for recycling. The popped corn is blown upward through an exhaust tube for collection by an external collector. Cooler air from the blower motor is circulated around the outer surfaces of the heating chamber and other areas within the relatively air tight enclosure to prevent overheating and provide efficient operation. Various sensing and timing circuits control the sequence of operation of the feeder and blower motors and heater coils.

16 Claims, 4 Drawing Sheets

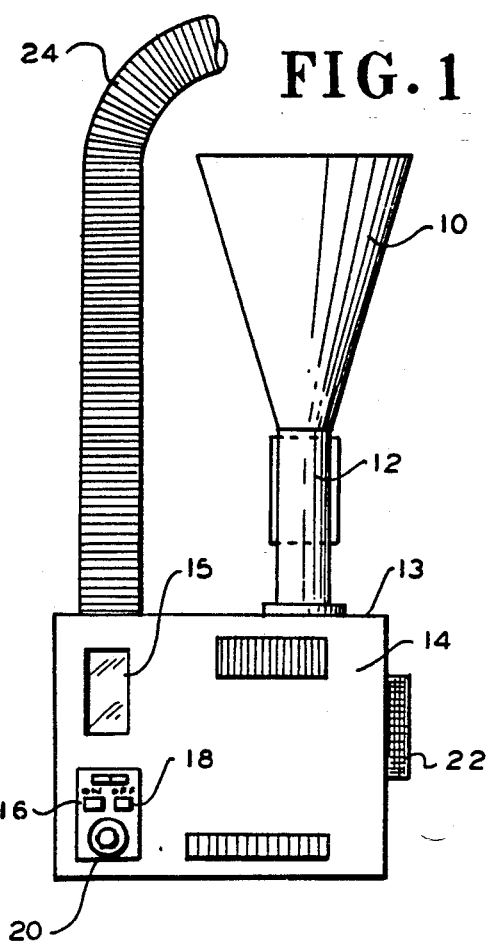
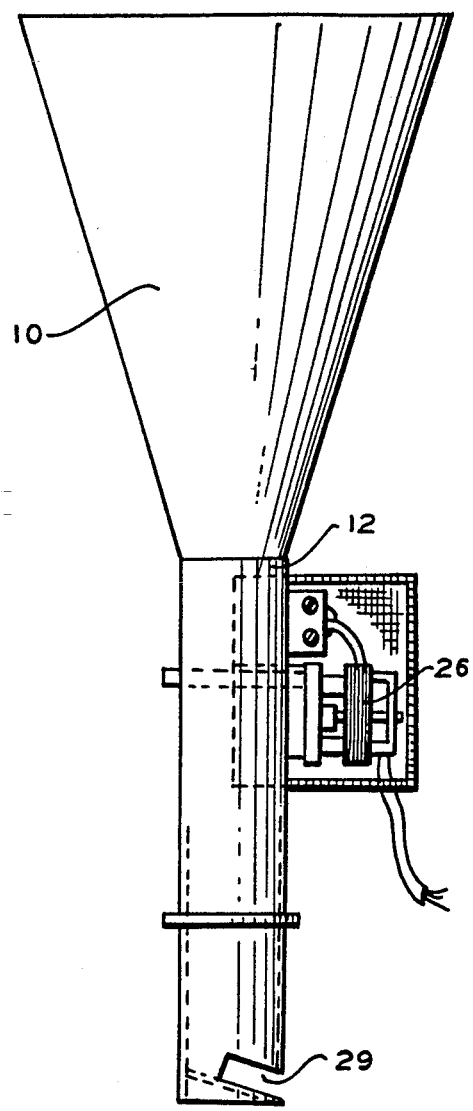
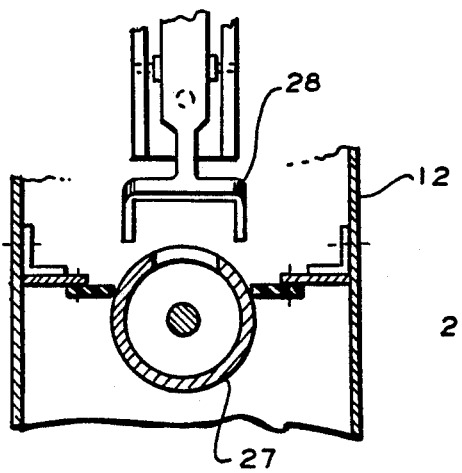
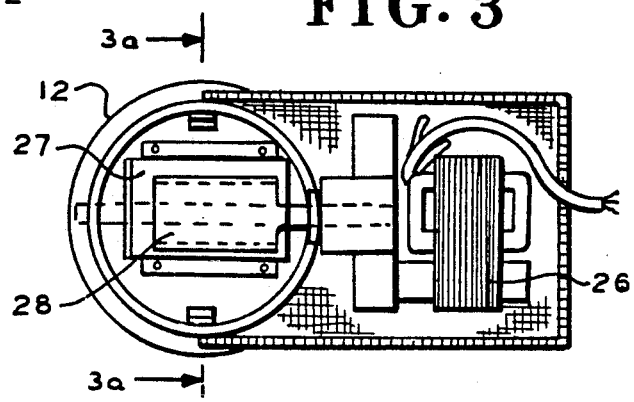

HOT AIR CORN POPPER FOR PACKAGING

BACKGROUND OF THE INVENTION

1. Field of the Invention

The present invention relates to hot air corn popping machines and particularly to an improved corn popper providing an environmentally safe packaging material as an alternative to polystyrene loose fill.

2. Description of the Prior Art

Presently known corn popper machines are primarily concerned with processes for improving the quality and quantity of popcorn as an edible material. An example of such a corn popper is shown in U.S. Pat. No. 4,727,798 to Nakamura, which receives raw corn through a hopper and metering feeder into a heating chamber. Hot air under pressure is directed upwardly through slots in the heating chamber where the corn is agitated and popped without the

SUMMARY OF THE INVENTION

It is, therefore, the primary object of the present invention to provide a unique packaging material which is environmentally safe.

It is another object of the invention to provide an improved hot air corn popper for use in supplying an environmentally safe packaging material.

A further object of the invention is to provide a corn popping machine feeding precise amounts of unpopped kernels into a popping chamber and utilizing a blower motor to supply air to a heating chamber for popping the corn and to surrounding areas for cooling the various surfaces.

An additional object of the invention is to provide a corn popping machine having automatic controls for feeding unpopped kernels into a popping chamber, heating the coils of a heating chamber, and gradually shutting the machine down when the corn is exhausted.

It is also an object of the invention to direct the popped corn through an exhaust section past a separator to collect unpopped kernels for reprocessing and to an external storage dispensing container for collecting the popped corn.

These objects are achieved with a unique hot air corn popping machine supplying popped corn as a packaging material. Unpopped kernels are fed into a hopper and feed unit having a motorized feeding system providing controlled amounts of kernels into a popping chamber. A blower motor provides air under pressure to a heating chamber having heating coils around the popping chamber for popping the corn and to areas around the heating chamber for cooling the outer surfaces and components within the relatively airtight enclosure. The popped corn and any unpopped kernels are directed down a ramp having a separating grating for collecting unpopped kernels and the popped corn is blown upward through an exhaust tube for collection by an external container. When the hopper is emptied of kernels, a sensing switch turns the feeder off and activates a timing circuit to continue action of the blower and heater until the popping chamber is exhausted. Thereafter, the heater coils are turned off while the blower remains on to cool the machine to a desired temperature, and then the entire machine is automatically turned off. Manual controls are also provided. Other objects and advantages will become apparent from the following description in conjunction with the accompanying drawings.

BRIEF DESCRIPTION OF THE DRAWINGS

The invention is illustrated in the accompanying drawings in which:

FIG. 1 is a front view of the hot air corn popping machine showing the front panel, hopper feeder and exhaust tube;

FIG. 2 is a side view of the feeder tube and motor;

FIG. 3 is a top view of the feeder tube, motor and control switch;

FIG. 3a is a side cross-sectional view of the feeder tube, rotor and switch;

DESCRIPTION OF THE PREFERRED EMBODIMENTS

Figure 4:
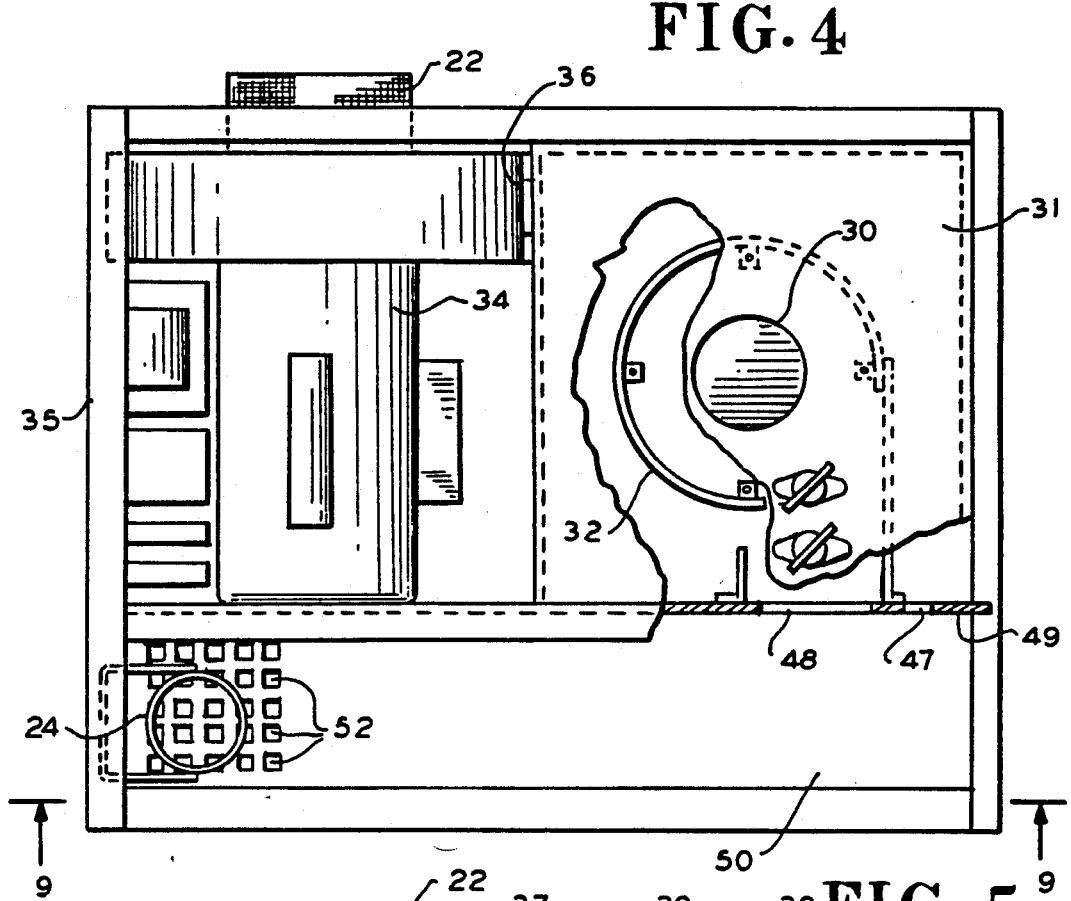
FIG. 4 is a top view of the corn popper with the top cover, hopper and feeder tube removed.

As shown in FIG. 1, the corn popping machine of the present invention includes a hopper 10 and feeder tube 12 into which unpopped corn kernels are supplied. The feeder tube passes through an opening in a top cover 13. A front panel 14 includes an observation window 15, power ON and OFF switches 16, 18 which include indicator lamps that both light when the hopper is empty, an emergency switch 20, and two additional lamps, preferably green and red, above switches 16 and 18, indicating blower on and heater on. An air intake 22 is along one side wall of the machine. An exhaust tube 24 directs the popped corn from the corn popper to a suitable external collection container. As shown in FIGS. 2, 3 and 3a, upon feeding a batch of unpopped kernels into the hopper 10 and feeder tube 12, a motorized feeding unit 26, having a rotor 27 with an elongated slot, controls the amount of kernels fed into a heating and popping chamber. High temperature silicone rubber gaskets enclose the spaces around the rotor to permit excess kernels to bypass the rotor to prevent seizure and allow their excess kernels to pass through whole and undamaged.

Figure 7:
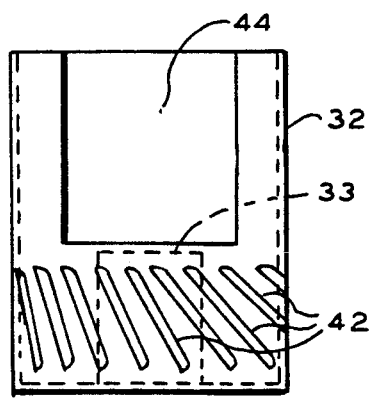
FIG. 7 is a side view of the popping chamber.

In order to operate the machine, it is first necessary to insert corn kernels into the hopper, the weight of the kernels activates a lever switch 28, in the path of the kernels to activate the control circuit and turn the power on to initiate a preheat mode activating the blower and heater. After reaching a predetermined temperature, sensor 51 turns the feeder motor on and feed controlled amounts through the tube outlet 29 at the bottom of one side into opening 30 of a cover 31, shown in FIG. 4, over a popping chamber 32, shown in FIGS. 5 and 7. A feeder timing circuit has a two minute repeat cycle which intermittently stops the feeding to permit proper popping temperature to be reached and evacuate the popping chamber.

Figure 5:
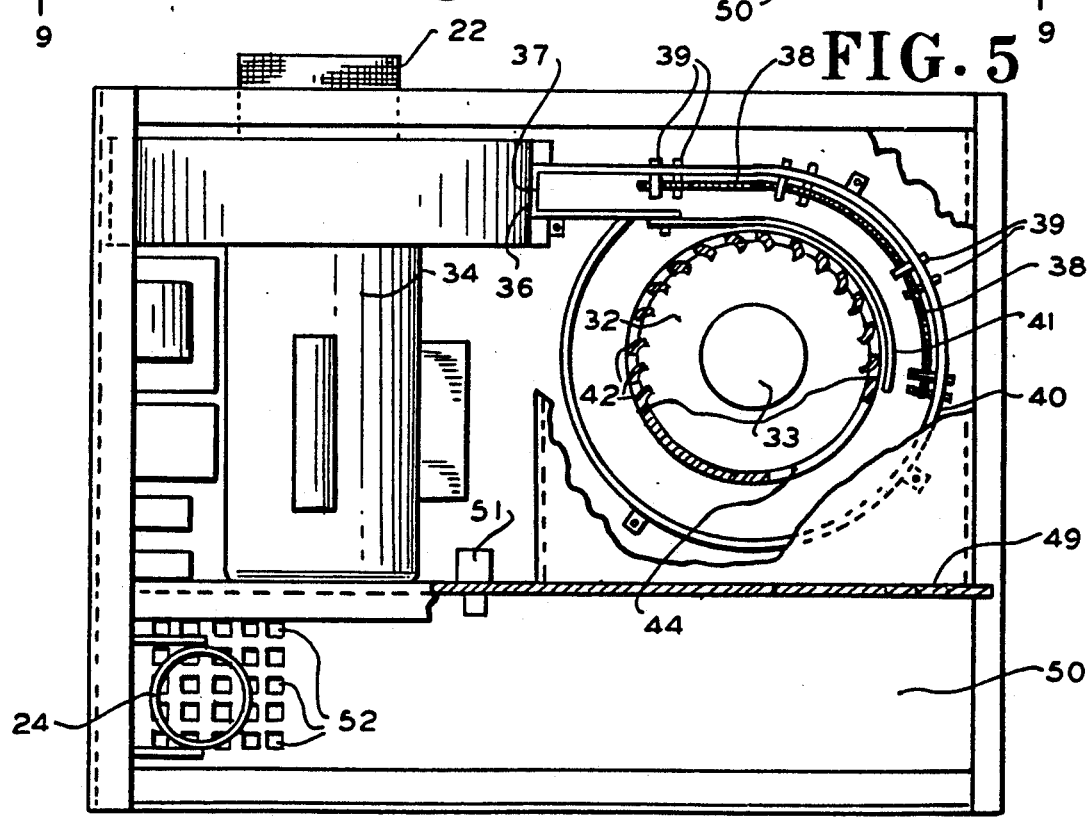
FIG. 5 is a top view of the blower motor and heating and popping chamber.
Figure 6:
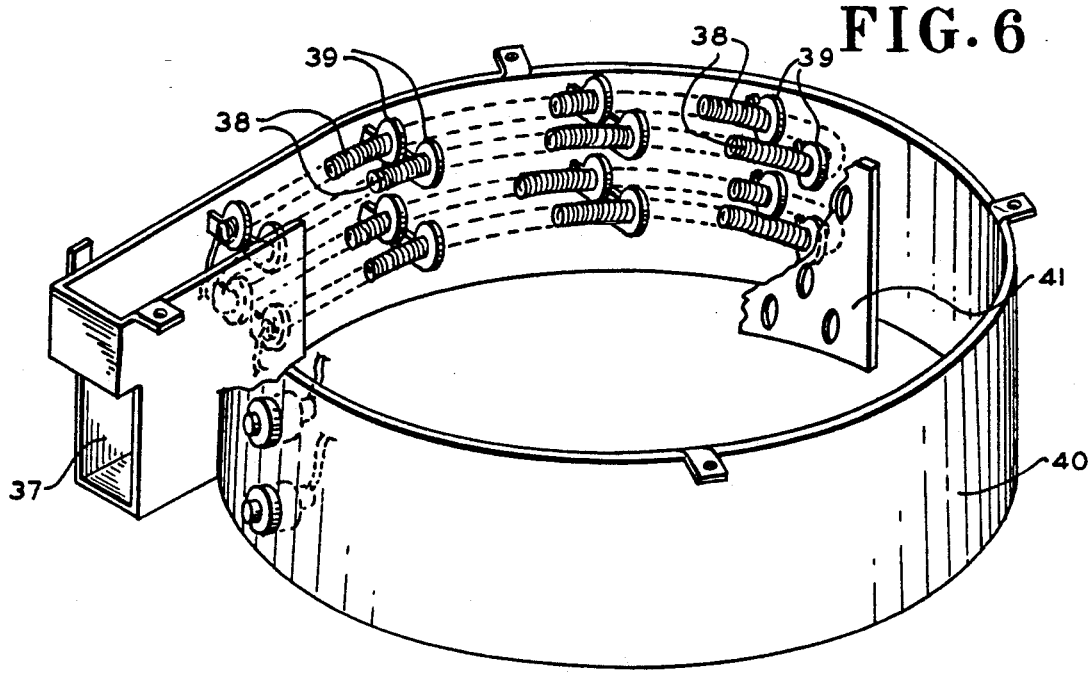
FIG. 6 is a perspective view of the heating chamber.
Figure 8A:
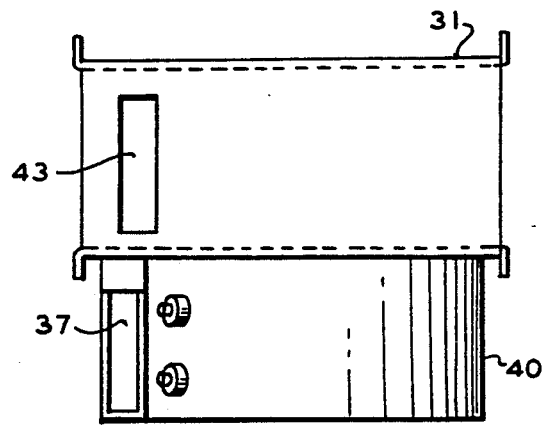
FIG. 8a is a back view of the heating and popping chambers showing the air inlets.
Figure 8:
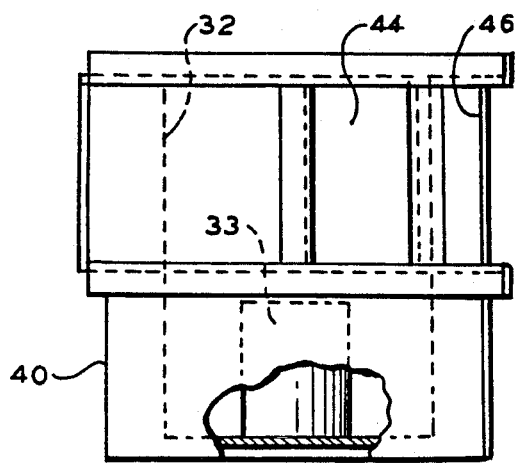
FIG. 8 is a side view of the combined heating and popping chambers and support.
Figure 9:
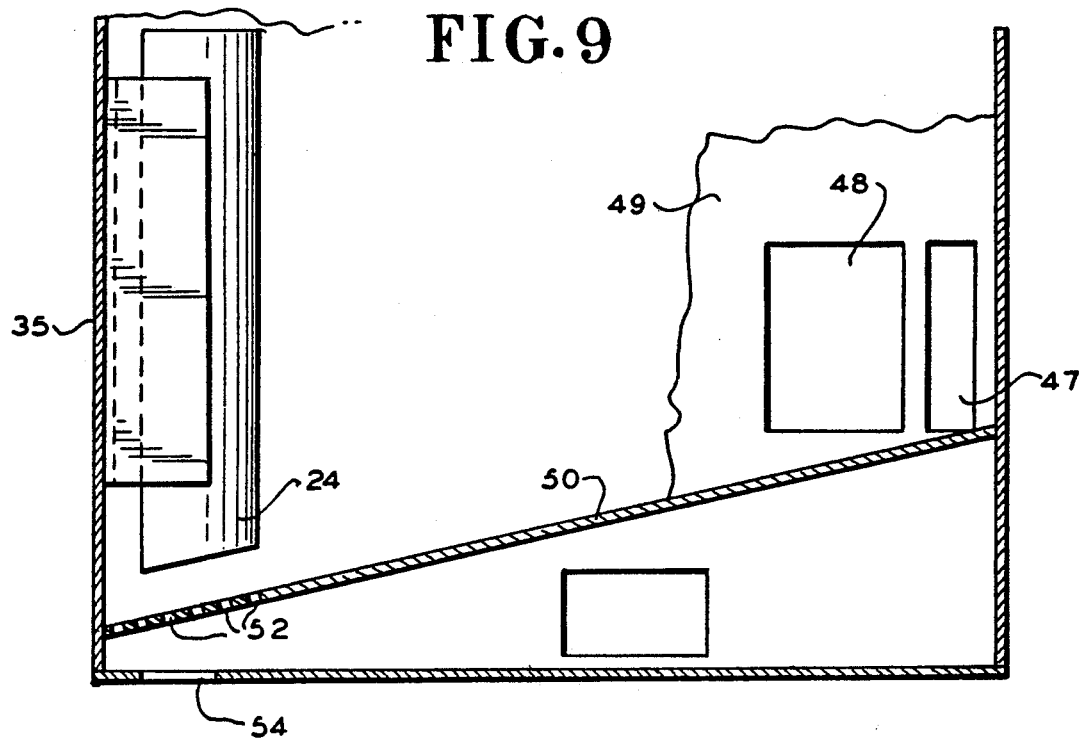
FIG. 9 is a side partial sectional view of the exhaust chute and pipe.
Figure 10:
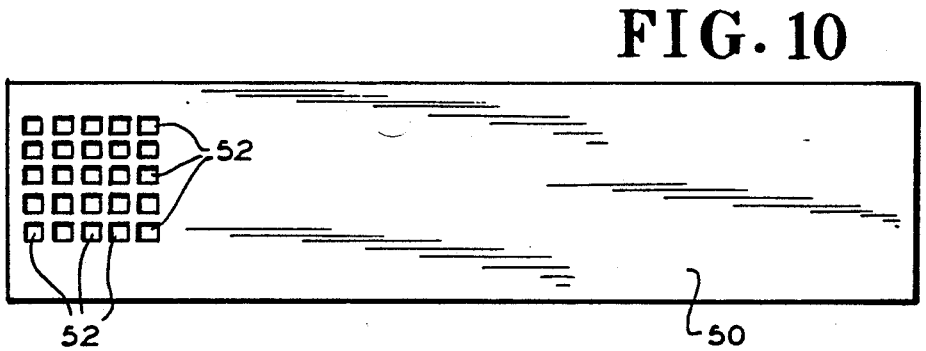
FIG. 10 is a top view of the exhaust chute and grating for collection of unpopped corn.

As shown in FIGS. 4 and 5, a blower motor 34 having enclosed fan blades is positioned adjacent the side wall air intake and rear wall 35 and supplies pressurized air to the system. The air is directed from opening 36 through inlet 37 over heating coils 38 supported in ceramic holders 39 in a heating chamber 40, shown separately in FIG. 6, enclosing the bottom of popping chamber 32. A deflector 41 having a plurality of holes prevents direct radiant heating of the kernels while passing heat into the chamber. The hot air passes through diagonal vents 42 in the bottom of popping chamber 32 to provide a circulating hot air stream around a central column 33 to heat the corn kernels until they pop open. The popped corn then passes out of opening 44, also shown in FIG. 8, out of the chamber support 46, through opening 48 in a partition wall 49, and into an exhaust chute 50, shown in FIGS. 4, 5, 9 and 10. The exhaust chute forms a ramp with the popped corn and any unpopped kernels being blown down the ramp from the top of chute 50 to the bottom. A separating grating 52 having a plurality of openings at the bottom permit unpopped kernels to pass through an opening 54 in the bottom wall into an external collection cup where they are held for recycling with a later batch to be fed into the hopper.

The popped corn which is very light is then blown up through an internal portion of exhaust tube 24 and the external tube portion into a collection container not shown. A portion of the air from blower motor 34 is directed through a side portion of opening 36 which is larger than the inlet 37 of heating chamber 40, under and around the heating chamber through opening 43 shown in FIG. 8a, to cool the outer surfaces of the heating chamber and then pass through opening 47 to combine with the hot air and popped corn passing through opening 48 into exhaust chute 50 to aid in blowing the popped corn upward through exhaust tube 24. Cooler air also circulates around other internal surfaces out of the path of the popped corn. Except for limited inlet and outlet openings, the entire corn popper machine chassis and covers provide a relatively airtight enclosure so that the air supplied by the blower motor is under pressure to facilitate an efficient flow of the popped corn out of the popping chamber and through the exhaust chute and tube to a collection container.

The power to actuate blower motor 34, heater coils 38 and the various switches, timing and control circuits is preferably from a 30 or 40 amp, 240 volt supply line. When the power switch 16 is turned on, the blower and heater lamps light, and the heating coils and popping chamber are heated to a desired temperature detected by a sensor 51 in the exhaust path which enables the feeding system and motor to be actuated. After the proper temperature is reached, sensor 51 is activated and initiates operation of the machine and starts the feeder motor to automatically feed the kernels into the popping chamber. When the hopper is empty, lever switch 28 is activated, turning the feeder motor off and the power ON and power OFF lamps light. This starts a five-minute shut down sequence. If corn is added and the ON switch pressed, the machine will continue. If corn is not added, a timing circuit is actuated to maintain the heater and blower on until all the kernels in the popping chamber are exhausted. When the popping chamber is empty, the heater coils and lamp are turned off while only the blower motor and lamp remain on to cool the machine and preserve the coils. When the machine is cooled to 110° F., it is shut off. This is all done automatically without an operator. If necessary, where enough popcorn has been produced, with unpopped kernels remaining in the hopper, an operator can shut the machine off by pressing the OFF switch on the front panel to initiate the shut down cycle. In the event of failure of a component, thermal sensors are provided to cause an automatic shut down, or emergency switch 20 can be operated manually to turn the machine off. Suitable known electrical circuits provide the various timing, sensing and control apparatus.

Figure 11:
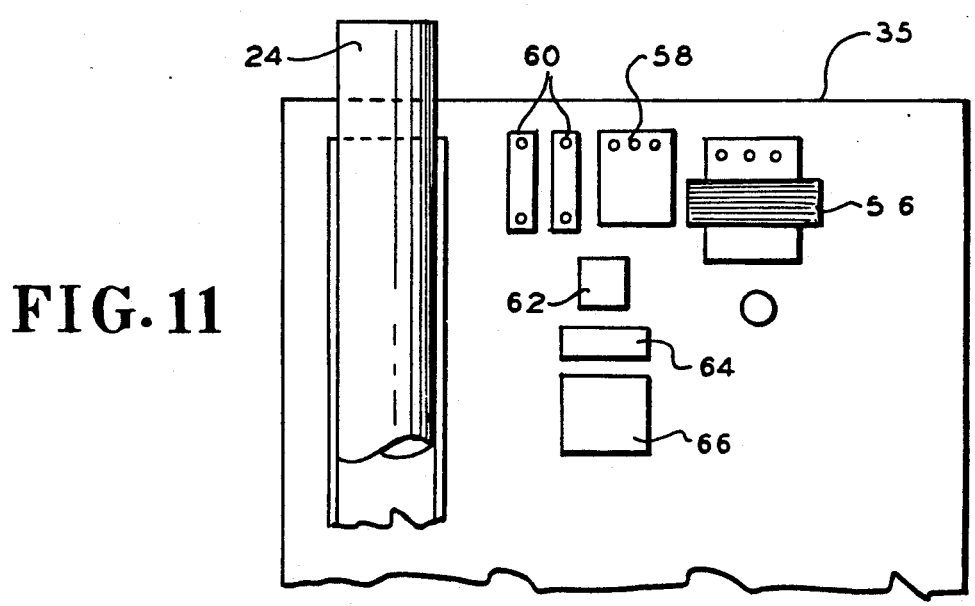
FIG. 11 is a view of the back panel showing various electrical components.

As shown in FIG. 11, several electrical components are mounted on the rear wall 35 including transformer 56 supplying 120 volts to the feeder motor, contactor power switch 58, manually controlled circuit breaker 60, relay 62 for holding the contactor switch on, a repeat cycle timer 64 for the feed motor and a delay timer 66 to maintain for the blower motor and heater coils, after which a temperature sensor allows only the blower motor to remain on to provide cooling air until a desired internal temperature is reached after which power is turned off.

The present invention thus provides a unique hot air corn popper useful in supplying an environmentally safe packaging material. While only a single embodiment has been illustrated and described, other variations may be made in the particular design and configuration without departing from the scope of the invention as set forth in the appended claims.

What is claimed is:

1. Corn popping apparatus comprising:
   a relatively airtight enclosure including front, back, top, bottom and side walls;
   an air inlet in one of said walls;
   a blower motor positioned within said enclosure adjacent said air inlet and providing a stream of pressurized air therein;
   a hopper positioned above said enclosure for receiving unpopped corn kernels;
   feeding means positioned under said hopper for feeding predetermined amounts of said kernels into said enclosure;
   a popping chamber within said enclosure receiving said unpopped kernels, said popping chamber having air inlet vents and an outlet opening;
   a heating chamber disposed around said popping chamber for heating and popping said kernels, said heating chamber including electrical heating coils therein and an air inlet receiving air from said blower motor, said coils heating said air, said heated air passing through said air vents of said popping chamber and causing said kernels to pop, the popped corn and heated air passing through said outlet;
   exhaust means for receiving said popped corn and heated air from said outlet and directing said popped corn to an external collection means, said exhaust means receiving unpopped kernels and including means for separating said unpopped kernels;
   means for directing a portion of said air stream around the outside of said heating chamber and other surfaces within said enclosure for cooling the heated surfaces and for combining said portion of said air stream with said heated air passing into said exhaust means; and electrical power supply means providing power for said blower motor and heating coils.

2. The apparatus of claim 1 including means for sensing the temperature in said enclosure and enabling operation of said feeding means upon reaching a predetermined temperature, said feeding means including a feeder motor having a slotted rotor in the path of said kernels feeding predetermined amounts into said enclosure, and a lever switch in said path, said lever switch being activated by the weight of said kernels and upon said predetermined temperature being reached to turn said feeder motor on.

3. The apparatus of claim 2 wherein said popping chamber is positioned under said feeding means and includes a plurality of angled air vents around the lower periphery for circulating said heated air therein.

4. The apparatus of claim 3 wherein said heating chamber includes a deflector spaced between said coils and popping chamber to limit direct radiant heat thereto.

5. The apparatus of claim 4 wherein said exhaust means includes an inlet receiving said popped corn and heated air, a passageway for said corn and air including a ramp with a grating at the lower end, said grating having openings separating said unpopped kernels, and an opening in said bottom wall under said grating for removing and collecting said kernels.

6. The apparatus of claim 5 wherein said exhaust means includes an exhaust tube directing said popped corn and air upwardly and out of said enclosure to an external collector.

7. The apparatus of claim 6 wherein said means for directing air around said heating chamber includes an air outlet from said blower motor larger than said air inlet of said heating chamber and passageways around said heating chamber within said enclosure.

8. The apparatus of claim 7 wherein said exhaust means includes a second inlet receiving said portion of said air stream for combining with said heated air.

9. The apparatus of claim 8 wherein said feeder motor includes a transformer connected to said power supply means supplying a reduced voltage thereto in relation to said blower motor.

10. The apparatus of claim 9 wherein said feeder motor rotor includes surrounding gaskets permitting excess kernels to pass there through to prevent seizure of said rotor and allow said excess kernels to pass therethrough whole and undamaged.

11. The apparatus of claim 10 including electrical control means for turning said power supply means on and off, and indicator lamps for indicating operating modes of said apparatus.

12. The apparatus of claim 11 including electrical control means for maintaining said blower motor and heater coils energized until exhaustion of kernels in said popping chamber and for thereafter de-energizing said heater coils and maintaining said blower motor energized for cooling said enclosure to a desired temperature and thereafter de-energizing said blower motor.

13. The apparatus of claim 12 including manual controls for switching power off.

14. The apparatus of claim 13 including control means for automatically turning power off under predetermined conditions.

15. The apparatus of claim 3 wherein said popping chamber includes a central post about which said heated air and kernels circulate.

16. The apparatus of claim 4 wherein said deflector includes a plurality of openings permitting limited direct radiant heating there through.

* * * * *